(12) United States Patent
Biancale et al.

(10) Patent No.: US 8,229,638 B2
(45) Date of Patent: Jul. 24, 2012

(54) METHOD FOR CLASSIFYING A CLUTCH UNIT

(75) Inventors: Raphael Biancale, Graz (AT); Gernot Maier, Hart Bei Graz (AT); Martin Kiessner-Haiden, Lebring (AT); Martin Parigger, Brodingberg (AT)

(73) Assignee: MAGNA Powertrain AG & Co. KG, Lannach (AU)

( * ) Notice: Subject to any disclaimer, the term of this patent is extended or adjusted under 35 U.S.C. 154(b) by 126 days.

(21) Appl. No.: 12/783,127

(22) Filed: May 19, 2010

(65) Prior Publication Data

US 2011/0015843 A1 Jan. 20, 2011

(30) Foreign Application Priority Data

May 22, 2009 (DE) .......................... 10 2009 022 240

(51) Int. Cl.
*G06F 7/00* (2006.01)

(52) U.S. Cl. .......................................................... 701/67

(58) Field of Classification Search ................... 701/51, 701/67, 68, 87; 477/83, 86
See application file for complete search history.

(56) References Cited

U.S. PATENT DOCUMENTS

| | | | |
|---|---|---|---|
| 5,029,678 A | 7/1991 | Koshizawa | |
| 6,694,798 B2 | 2/2004 | Kuhner et al. | |
| 6,711,486 B1 | 3/2004 | Karlsson et al. | |
| 7,032,733 B2 | 4/2006 | Parigger | |
| 7,111,716 B2 | 9/2006 | Ekonen et al. | |
| 7,129,716 B2 | 10/2006 | Schroeder | |
| 7,286,922 B1* | 10/2007 | Fischer et al. | 701/51 |
| 7,289,892 B2 | 10/2007 | Isogai et al. | |
| 7,357,208 B2 | 4/2008 | Billig et al. | |
| 2009/0090591 A1 | 4/2009 | Petzold et al. | |
| 2010/0113218 A1* | 5/2010 | Herter et al. | 477/83 |

FOREIGN PATENT DOCUMENTS

| | | |
|---|---|---|
| AT | 005722 | 10/2002 |
| DE | 3879417 | 6/1993 |
| DE | 19540921 | 5/1997 |
| DE | 10009860 | 9/2001 |
| DE | 60007330 | 6/2004 |
| DE | 10361147 | 7/2004 |
| DE | 10333651 | 2/2005 |
| DE | 10346671 | 5/2005 |
| DE | 102006019824 | 10/2007 |
| WO | 03025422 | 3/2003 |
| WO | 2005009797 | 2/2005 |

* cited by examiner

*Primary Examiner* — Kim T Nguyen
(74) *Attorney, Agent, or Firm* — Bachman & LaPointe, P.C.

(57) ABSTRACT

A method is described for classifying a clutch unit for a drivetrain of a motor vehicle, wherein the clutch unit has at least one friction clutch for the controllable transmission of a torque from an input element to an output element and has an actuator for actuating the friction clutch. Here, the clutch unit is controlled on the basis of a predefined characteristic curve which describes a predefined dependency of the clutch torque to be transmitted on an actuator control variable.

11 Claims, 5 Drawing Sheets

METHOD FOR CLASSIFYING A CLUTCH UNIT

BACKGROUND OF THE INVENTION

The present invention relates to a method for classifying a clutch unit for a drivetrain of a motor vehicle, wherein the clutch unit has at least one friction clutch for the controllable transmission of a torque from an input element to an output element and has an actuator for actuating the friction clutch, and wherein the clutch unit is controlled on the basis of a predefined characteristic curve which describes a predefined dependency of the clutch torque to be transmitted on an actuator control variable.

A clutch unit of said type serves, for example in a transfer box of a motor vehicle with all-wheel drive, for the controllable transmission of a drive torque to a primary axle and/or a secondary axle of the motor vehicle. In a so-called "torque on demand" transfer box, the wheels of the primary axle are permanently driven, while a part of the drive torque can be selectively transmitted to the wheels of the secondary axle by means of said clutch unit. The transfer box may also be designed as a controllable central differential in which the clutch unit is assigned to a differential lock in order to set the distribution of the drive torque in the longitudinal direction of the vehicle. A clutch unit of said type may also be used in a torque transmitting device which, in a motor vehicle with a permanently driven front axle, enables a part of the drive torque to be transmitted to the rear axle, with the unit being arranged for example on the front axle differential or on the rear axle differential. Such different applications and arrangements are known from U.S. Pat. No. 7,111,716 B2.

A clutch unit of the type mentioned in the introduction may also act in the transverse direction of the motor vehicle, for example for a differential lock of an axle differential or in a torque superposition arrangement of an axle differential (so-called "torque vectoring"). In all of the above cases, the clutch unit can connect a rotating input element (for example input shaft) and a rotating output element (for example output shaft) to one another in a frictionally engaging manner, in particular in order to transmit a drive torque. Alternatively, the clutch unit may be configured as a brake, with a stationary input element or a stationary output element, in particular in order to transmit a braking torque.

In the abovementioned applications of the clutch unit, the clutch unit is arranged downstream of the main transmission of the drivetrain (that is to say downstream of the manual or automatic shift transmission or CVT) with regard to the power flow direction. The clutch torque—that is to say the torque transmitted by the friction clutch—is conventionally variably adjusted as a function of the respective driving situation. Depending on the driving dynamics requirements, which may for example be dependent on the driving situation or on environmental influences (for example slippery roadway surface with slipping drive wheels), a change in the torque to be transmitted by the clutch unit thus takes place. For this purpose, not only is a controlled engagement of the friction clutch required, but rather often also a relatively long period of operation with a precisely set clutch torque.

The clutch unit comprises a friction clutch and an actuator for actuating the friction clutch. The friction clutch is typically a multiplate clutch, that is to say a multi-disk clutch. The actuator may have an electric motor. The actuator may additionally comprise a gearing device for a speed reduction of a rotational movement of a motor shaft of the electric motor. Furthermore, the actuator may have a deflecting device which converts a rotational movement of the actuator (for example motor shaft or gearing element) into a translatory movement of the friction clutch (for example pressure piston). Alternatively, an electromagnetic, hydraulic or electrohydraulic actuator may however also be provided.

A clutch unit of the type mentioned in the introduction and a method for classifying a clutch unit of said type are known from WO 2003/025422 A1 (corresponding to U.S. Pat. No. 7,032,733 B2), the content of which is expressly incorporated into the content of disclosure of the present application. As described in more detail in WO 2003/025422 A1, it is not imperatively necessary for direct torque regulation (with the measured actual clutch torque as a regulating variable) to be provided for setting a determined desired clutch torque. In fact, as a result of a corresponding calibration of the clutch unit, it is possible for the friction clutch to be controlled via the indirect route of position regulation of the actuator. To set the desired torque to be transmitted, for example the rotational angle of the electric motor or some other position variable of the actuator is thus taken into consideration as a regulating variable and set to a value which corresponds to the desired clutch torque. For this purpose, a clutch torque/actuator position dependency is empirically determined which is stored as a characteristic curve for example in the form of a look-up table (LUT) or a function (that is to say a calculation rule). Therefore, for a certain torque demand, the corresponding nominal value of the relevant position variable of the actuator (for example rotational angle) is determined and set via regulation on the basis of said dependency. Said characteristic curve may be determined individually for each clutch unit or torque transmitting arrangement at the factory.

Here, it is essential that the clutch torque/actuator control variable dependency described by the characteristic curve be brought into the closest possible correlation with the actual clutch torque/actuator control variable dependency. This may in principle take place by virtue of the profile of the characteristic curve for each individual clutch unit being specified and stored according to the actual clutch torque/actuator control variable dependency. This however entails a high level of calculation expenditure and a large memory requirement. Since the differences in the clutch characteristic between the clutch units of a series are usually only relatively small, one possible approach is therefore not to establish a complete characteristic curve but rather to suitably modify a characteristic curve (base characteristic curve) specified uniformly for all clutch units of the same type. For example, the gradient of the characteristic curve may be modified, with then only a single value for the modified gradient being assigned to the clutch unit and correspondingly stored.

To further reduce the memory requirements, every clutch unit may be graded into one of a plurality of discrete classes according to the determined value for the modification. Such a process is referred to as classification. The determined gradient or a corresponding corrective value may for example be stored in a non-volatile memory in the clutch unit. Alternatively, the classification may also be carried out by means of an electrical circuit arrangement which is assigned to the respective clutch unit. For example, the clutch unit may be provided with a coding plug, the circuitry of which relates to the corrective value. A coding plug of said type is disclosed for example in WO 2005/009797 A1 (corresponding to U.S. Pat. No. 7,129,716 B2).

In the case of classification carried out at the factory, the conventional approach is for a predefined rotational speed difference to be set between the input element and the output element of the clutch unit to be classified on a test stand, for a predefined nominal value of the clutch torque to be set on the basis of the base characteristic curve, and for the actually transmitted clutch torque, that is to say the actual value of the clutch torque, to be detected by means of suitable sensors. The deviation between the nominal value and the actual value is subsequently determined. A corrective value for adapting the base characteristic curve can be determined on the basis of the deviation.

In said type of classification, it is possible to firstly set the rotational speed difference, to then set the actuator corresponding to the nominal value of the predefined clutch torque, and to subsequently measure the actual value of the clutch torque. This calibration method may be referred to as a dynamic method. Alternatively, it is also possible for firstly the actuator to be set corresponding to the nominal value of the clutch torque, for the predefined rotational speed difference to then be set and for the actual value of the clutch torque to subsequently be detected. This calibration method may be referred to as a static method. It has been found that the actual value of the clutch torque determined by means of the static method can deviate from the actual value determined by means of the dynamic method for the same rotational speed difference and the same nominal value of the clutch torque. The determined actual dependency between the actuator control variable and the clutch torque is thus dependent on the sequence of setting steps during the calibration. Depending on the driving situation, it can be the case that both a characteristic curve adapted according to the dynamic process and also a characteristic curve adapted according to the static method do not sufficiently accurately represent the real setting behavior, which leads to undesired impairment of the setting accuracy. In particular, in certain driving situations, for example during a starting process, it can be the case that inadmissibly high clutch torques are transmitted, which can result in damage to clutch components.

It is therefore an object of the invention to improve the calibration of clutch units of the stated type such that the setting accuracy is increased and the clutch components are protected from excessively high clutch torques.

SUMMARY OF THE INVENTION

The foregoing object is achieved by providing a calibrating method comprising the following steps:

(a) specifying at least one first and one second value range of the clutch torque to be transmitted;

(b) determining at least one first corrective value, wherein firstly a predefined rotational speed difference is set between the input element and the output element, wherein subsequently, at the predefined rotational speed difference, the actuator is set to a value of the actuator control variable which, according to the predefined characteristic curve, corresponds to a nominal value of a clutch torque lying within the first value range, and wherein after the setting of the actuator, an actual value of the clutch torque is detected by measurement, wherein the first corrective value is determined as a function of a deviation between the nominal value and the actual value;

(c) determining at least one second corrective value, wherein firstly the actuator is set to a value of the actuator control variable which, according to the predefined characteristic curve, corresponds to a nominal value of a clutch torque lying within the second value range, wherein after the setting of the actuator, a predefined rotational speed difference is set between the input element and the output element, and wherein an actual value of the clutch torque is detected by measurement after the setting of the rotational speed difference, wherein the second corrective value is determined as a function of a deviation between the nominal value and the actual value; and (d) adapting the predefined characteristic curve by means of the first and the second corrective value.

According to the invention, it has been recognized that a clutch unit calibrated by means of the dynamic method has a higher setting accuracy in certain ranges of the clutch torque than a clutch unit calibrated by means of the static method, while in other ranges of the clutch torque, a clutch unit calibrated by means of the static method has a higher setting accuracy than a clutch unit calibrated by means of the dynamic method. If two separate value ranges of the clutch torque to be transmitted are now specified, and for each value range a calibration according to the method which is particularly suitable for said range is carried out, then it is possible overall to obtain an improved setting accuracy of the calibrated clutch unit. According to the invention, the two different calibration methods are thus advantageously combined to form an overall calibration method. Each of the calibration methods can be used for the range for which it yields the better setting accuracy results. As a result, this enables a more precise representation of the actual conditions by the characteristic curve.

The stated actuator control variable is in particular an actuator position variable (for example rotational angle). Alternatively, the actuator control variable may for example be represented by a hydraulic pressure.

In a second embodiment, the first and second value ranges are specified as a function of a control strategy of the motor vehicle, which control strategy is defined in particular by a dependency of the clutch torque to be transmitted on the rotational speed difference between the input element and the output element. The value ranges are thus adapted to the real conditions of the associated vehicle. In this way, it is possible for a high setting accuracy of the clutch unit to be classified to be obtained over the entire operating range.

In a further embodiment, the first value range corresponds to low clutch torques and the second value range corresponds to high clutch torques. Specifically, it has been found that the dynamic calibration method leads to better setting accuracy results than the static calibration method in the range of low clutch torques, while the static calibration method is more suitable, with regard to setting accuracy, for the range of high clutch torques. This is associated with the fact that, during clutch operation according to the conventional control strategy, low clutch torques are set via regulation in various driving situations, while high clutch torques, for example for starting, are set via pilot control.

At least two corrective values may be determined for one or both value ranges. This increases the accuracy of the characteristic curve adaptation.

Preferably, for the adaptation of the characteristic curve, a gradient and/or an offset of the characteristic curve is modified. In particular, for the adaptation of the characteristic curve, a gradient adaptation value and an offset adaptation value may be determined as a function of the first and second corrective values. The stored characteristic curve itself remains unchanged in such a process, since only two parameters associated with the characteristic curve are updated. A complete re-establishment of the characteristic curve with corresponding calculation and memory expenditure is avoided in this way. The stated gradient adaptation value and the stated offset adaptation value may be stored in simple look-up tables.

The predefined characteristic curve—that is to say the abovementioned base characteristic curve—is preferably stored in a control device which is connected to the clutch unit, wherein the determined gradient adaptation value and the determined offset adaptation value are stored in a non-volatile memory which is assigned to the control device. The assignment may be realized for example by means of an electrical connection. Therefore, the predefined characteristic curve, which is the same for all clutch units of a certain type, is advantageously stored in the control device, such that the control devices can be manufactured uniformly, separately from the clutch units. The gradient adaptation value and the offset adaptation value which bear the individual calibration information are stored in a separate memory which, when the clutch unit is fully assembled, can be read out by the control device. Since said memory must only store individual adaptation values, it may be of correspondingly small design.

It is for example possible for a non-volatile memory to be provided within the control device which is designed as an add-on unit. The non-volatile memory may also be designed to store further parameter sets relating to the correction. Alternatively, the clutch unit may be assigned a coding plug with fixed circuitry, the circuitry of which coding plug relates in a predetermined way to the gradient adaptation value and the offset adaptation value.

The gradient adaptation value and/or the offset adaptation value is preferably selected from a group of several pre-defined class values. In other words, it is possible for a plurality of possible classes of different gradient adaptation values and offset adaptation values to be specified, one of which is selected on the basis of the first and second corrective values. The memory requirement can be further reduced in this way.

In a further embodiment, the predefined characteristic curve is divided into two characteristic curve sections which correspond to the first and the second value range, and a respective gradient adaptation value and a respective offset adaptation value is determined for each of the characteristic curve sections. The characteristic curve is thus modified in sections, wherein for each section, a corrective value determined by means of the optimum calibration method for the respective value range is taken into consideration for the modification. Should a particularly pronounced correction be required for one of the value ranges while only a relatively minor correction is required for the other value range, this situation can be easily handled as a result of the division of the characteristic curve on the basis of the value ranges.

It is also possible for more than two value ranges of the clutch torque to be transmitted to be specified, in order to thereby further increase the adaptation of the characteristic curve to the actual conditions.

BRIEF DESCRIPTION OF THE DRAWINGS

A clutch unit or torque transmission arrangement calibrated according to the invention may be used in different arrangements for transmitting a torque along a drivetrain of a motor vehicle, as explained in the introduction. The invention is explained below, with reference to the drawings, merely by way of example in connection with a "torque on demand" transfer box.

DETAILED DESCRIPTION

Figure 1:
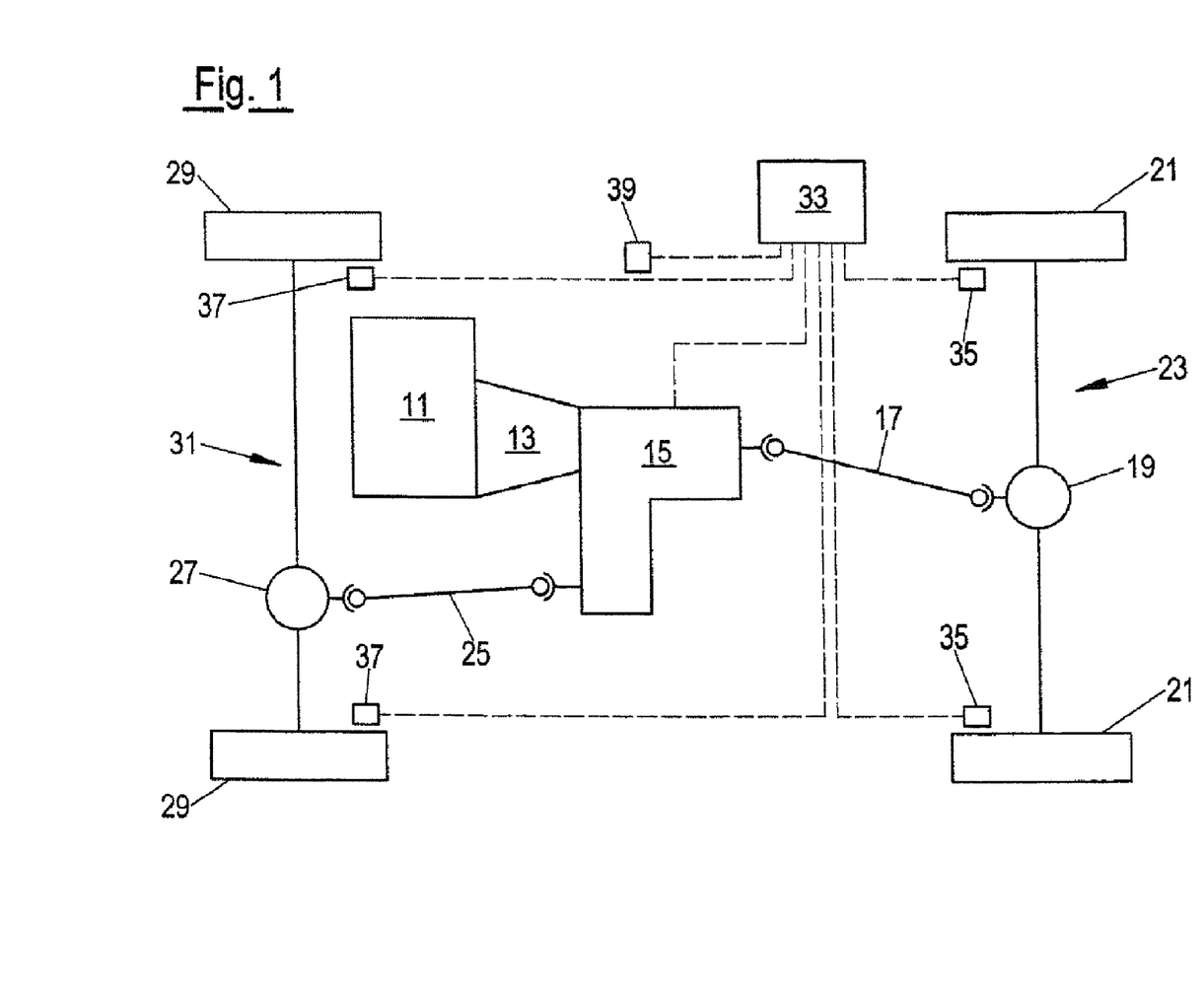
FIG. 1 shows a schematic view of a drivetrain of a motor vehicle.

FIG. 1 schematically shows a drivetrain of a motor vehicle having switchable all-wheel drive. The drive torque generated by an internal combustion engine 11 is supplied via a main transmission 13 (manual shift transmission or automatic transmission) to a transfer box 15. A first output of the transfer box 15 is coupled via a cardan shaft 17 to a rear axle differential gear 19. The wheels 21 of the rear axle 23 are permanently driven in this way. The rear axle 23 therefore forms the primary axle of the vehicle. A second output of the transfer box 15 is coupled via a cardan shaft 25 to a front axle differential gear 27. In this way, a part of the drive torque of the internal combustion engine 11 can selectively be transmitted to the wheels 29 of the front axle 31. The front axle 31 thus forms the secondary axle of the vehicle.

FIG. 1 also shows a driving dynamics regulating unit 33. The latter is connected to wheel rotational speed sensors 35, 37 which are assigned to the wheels 21 of the rear axle 23 and to the wheels 29 of the front axle 31 respectively. The driving dynamics regulating unit 33 is also connected to further sensors 39, for example a yaw rate sensor. As a function of the signals of the sensors 35, 37, 39, the driving dynamics regulating unit 33 generates a control signal which is supplied to a control device (not shown in FIG. 1) of the transfer box 15 in order to hereby set a certain distribution of the drive torque between the two axles 23, 31 of the vehicle. Said control signal is in particular a nominal value of a clutch torque, that is to say a torque demand for a clutch unit of the transfer box 15.

Figure 2:
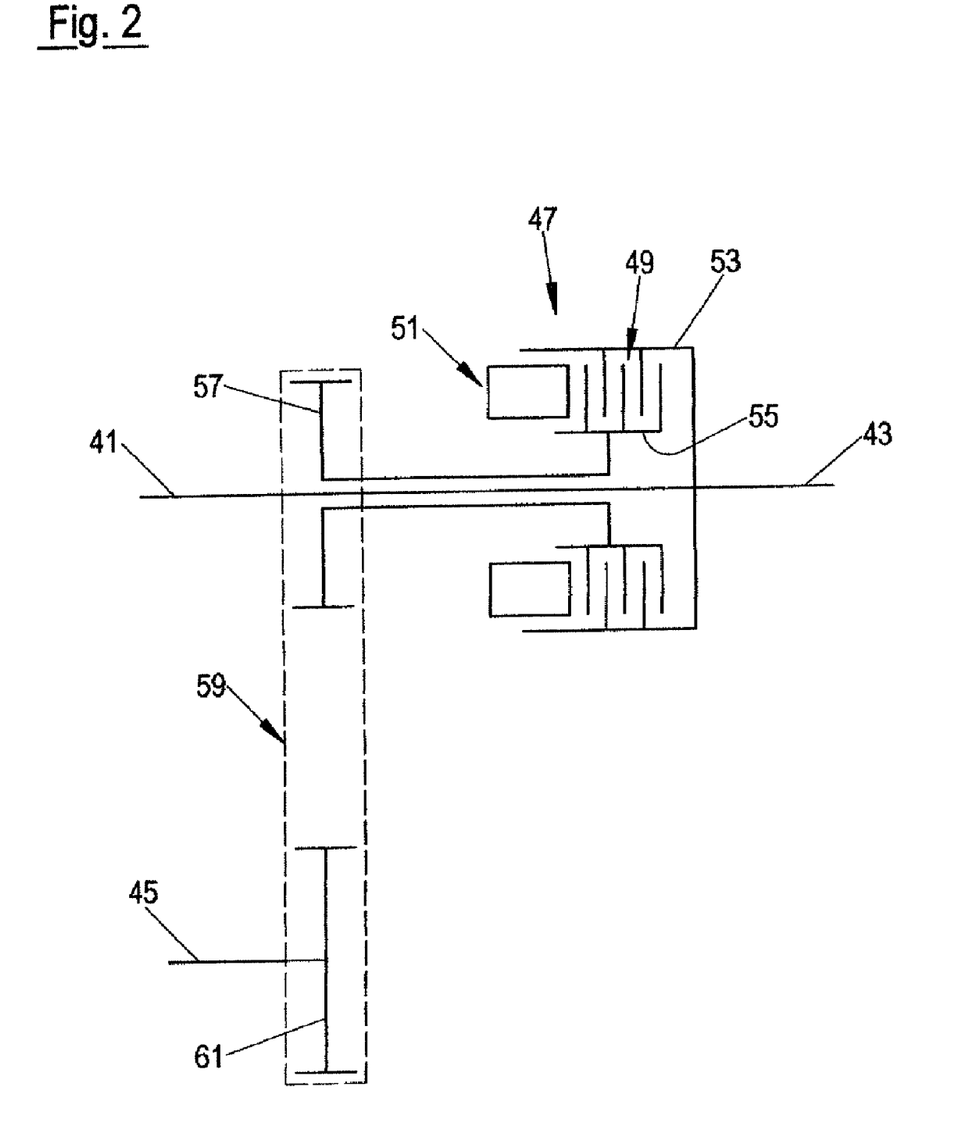
FIG. 2 shows a schematic view of a transfer box.

FIG. 2 shows a schematic cross-sectional view of the transfer box 15 according to FIG. 1. The transfer box 15 has an input shaft 41, a first output shaft 43 and a second output shaft 45. The first output shaft 43 is formed coaxially with respect to and is rotationally fixed with respect to—and preferably formed in one piece with—the input shaft 41. The second output shaft 45 is arranged parallel and offset with respect to the input shaft 41.

The transfer box 15 has a clutch unit 47 with a friction clutch 49 and an actuator 51. The friction clutch 49 has a clutch cage 53 which is rotationally fixedly connected to the input shaft 41 and to the first output shaft 43 and bears a plurality of clutch plates. The friction clutch 49 also has a rotatably mounted clutch hub 55 which likewise bears a plurality of clutch plates which engage, in an alternating arrangement, into the plates of the clutch cage 53. The clutch hub 55 is rotationally fixedly connected to a drive input gearwheel 57 of a chain drive 59. A drive output gearwheel 61 of the chain drive 59 is rotationally fixedly connected to the second output shaft 45. Instead of the chain drive 59, a gear train may be provided, for example with an intermediate gearwheel between said gearwheels 57, 61.

By actuating the actuator 51 in the direction of engagement of the friction clutch 49, an increasing proportion of the drive torque introduced into the transfer box 15 via the input shaft 41 can be transmitted to the second output shaft 45.

Figure 3:
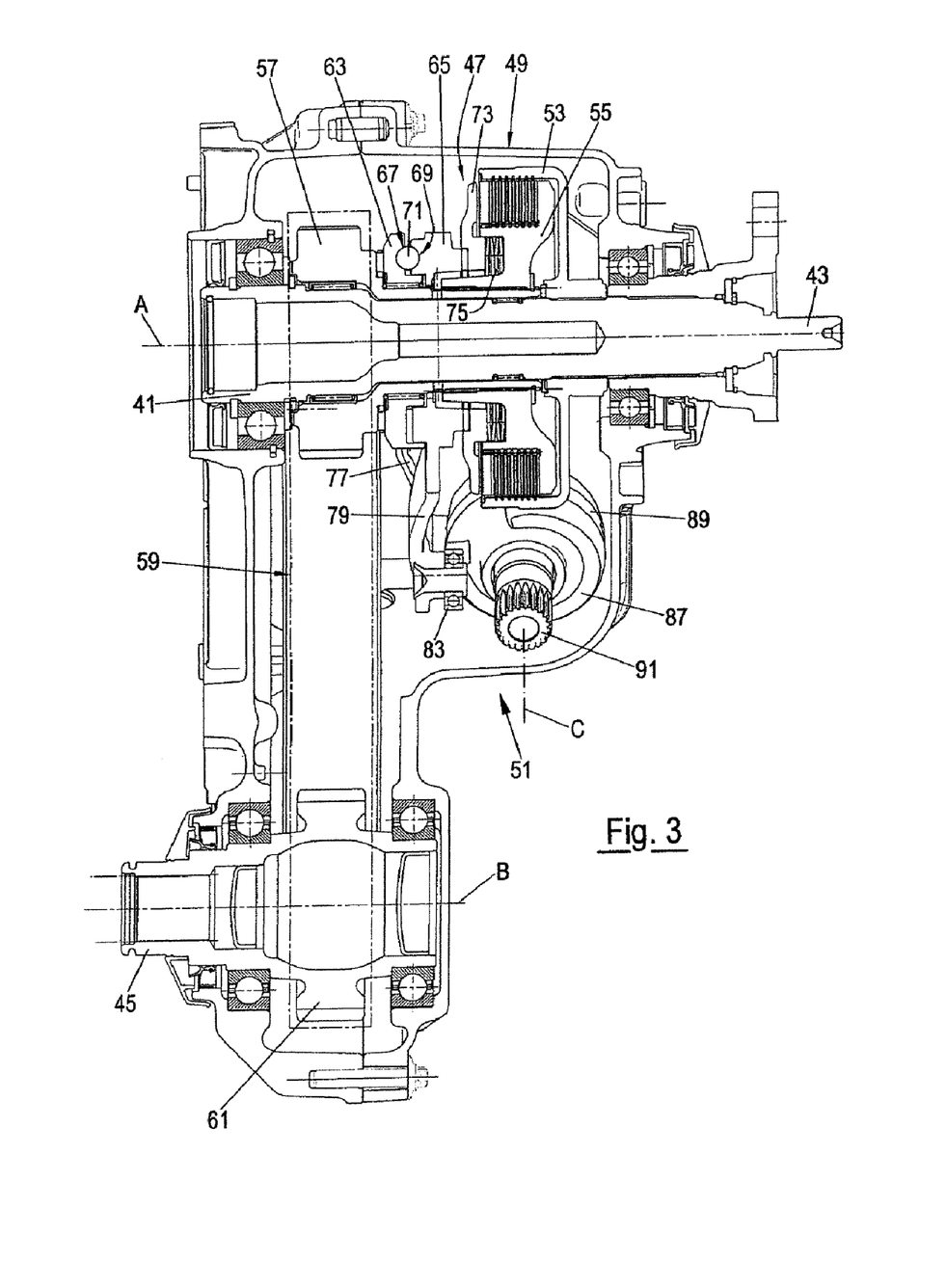
FIG. 3 shows a cross-sectional view of the transfer box according to FIG. 2.

FIG. 3 shows details of the transfer box 15 according to FIG. 2 in a cross-sectional view. It can be seen in particular that the actuator 51 has a support ring 63 and an actuating ring 65, which are mounted so as to be rotatable with respect to the rotational axis A of the input shaft 41 and of the first output shaft 43. The support ring 63 is supported axially on the drive input gearwheel 57 via an axial bearing. In contrast, the adjusting ring 65 is mounted so as to be axially movable. At the sides facing toward one another, the support ring 63 and the adjusting ring 65 have in each case a plurality of ball channels 67 and 69. These run in the circumferential direction with respect to the axis A and are inclined in a ramped fashion in the circumferential direction relative to a plane normal to the axis A, that is to say the ball channels 67, 69 have a varying depth in the circumferential direction. In each case one ball channel 67 of the support ring 63 and a ball channel 69 of the adjusting ring 65 are situated opposite one another and in this way enclose an associated ball 71. By rotating the support ring 63 and the adjusting ring 65 relative to one another, it is therefore possible to effect an axial movement of the adjusting ring 65, with the adjusting ring 65 interacting via an axial bearing with a pressure ring 73 of the friction clutch 49. The pressure ring 73 is preloaded in the release direction of the friction clutch 49 by means of a plate spring arrangement 75.

A respective actuating lever 77 and 79 is integrally formed on the support ring 63 and on the adjusting ring 65. A respective roller 81 and 83 is rotatably mounted on the free end of each lever 77, 79. Via the rollers 81, 83, the actuating levers 77, 79 interact with the two end sides 85, 87 of a control disk 89 which is rotatable about an axis C. The end sides 85, 87 have an inclined profile in the circumferential direction in relation to a plane normal to the axis C, that is to say the control disk 89 is of wedge-shaped design in cross section. By rotating the control disk 89, the actuating levers 77, 79 can therefore be moved in a scissors-like manner in order to rotate the support ring 63 and the actuating ring 65 relative to one another. The control disk 89 has an integrally formed spline toothing extension 91. By means of the latter, the control disk 89 can be drive-connected to an electric motor and to an associated step-down gearing (not shown in FIG. 3).

It is therefore possible, by means of corresponding activation of said electric motor, for the control disk 89 to be driven in a rotational movement in order to hereby pivot the actuating levers 77, 79 relative to one another. The rotation of the support ring 63 and of the adjusting ring 65 relative to one another which is caused in this way generates an axial movement of the adjusting ring 65. The pressure ring 73 therefore generates an engagement of the friction clutch 49 or—assisted by the plate spring arrangement 75—a disengagement of the friction clutch 49.

Figure 4:
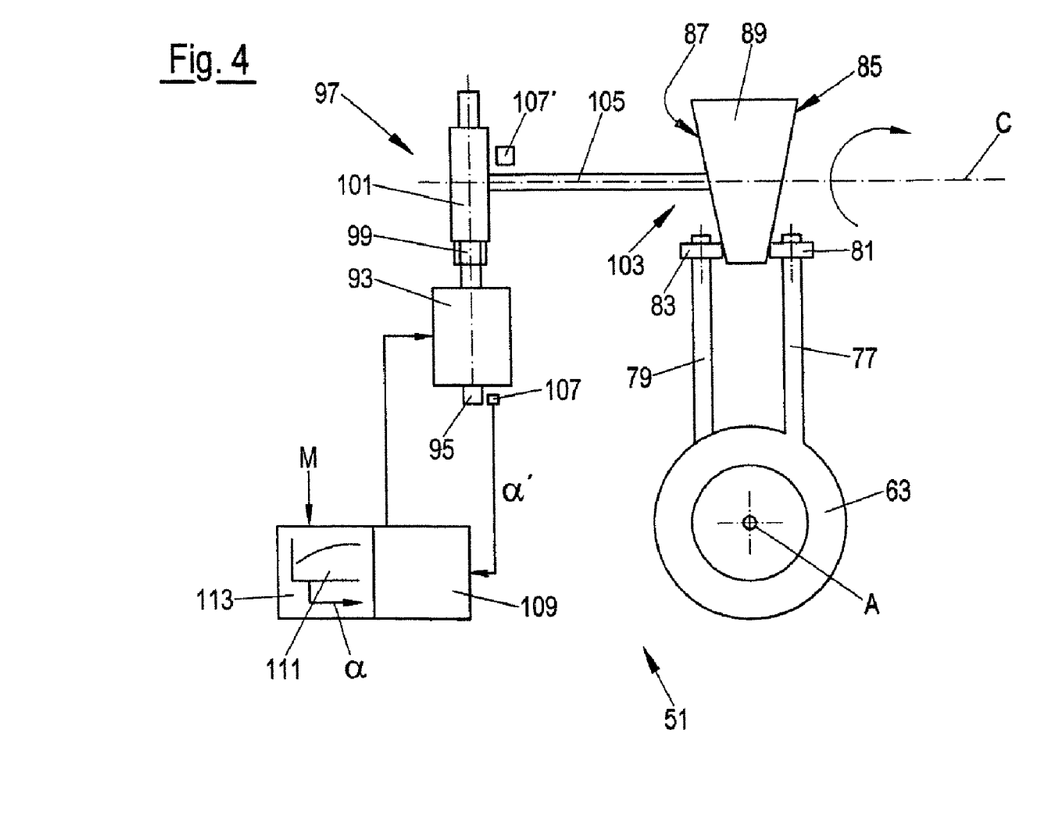
FIG. 4 shows a schematic view of a clutch actuator.

FIG. 4 shows the actuator 51 according to FIGS. 2 and 3 in a schematic view. The actuator 51 has a controllable electric motor 93 with an armature shaft 95, a step-down gearing 97 with a worm 99 and a worm gear 101, and also a deflecting device 103. By means of the deflecting device 103, a rotational movement of an output shaft 105 of the step-down gearing 97 is converted into a translatory, that is to say rectilinear movement of the pressure ring 73 (FIG. 3). The deflecting device 103 comprises the control disk 89 and the support ring 63 and the adjusting ring 65 with the actuating levers 77, 79 and the balls 71 according to FIG. 3. A sensor 107 is arranged on the armature shaft 95 of the electric motor 93, which sensor 107 is designed for example as an incremental encoder. As shown in FIG. 4, the sensor 107 may alternatively also be arranged as sensor 107' on the output shaft 105.

The sensor 107 generates a signal which corresponds to an actuator position value. In the exemplary embodiment shown, this is the rotational angle actual value $\alpha'$ of the armature shaft 95. Said signal $\alpha'$ is supplied to a control device 109 of the transfer box 15. From the driving dynamics regulating unit 33 of the motor vehicle (FIG. 1), the control device 109 also receives a torque demand M, that is to say a nominal value of the clutch torque. As will be explained in detail below, the control device 109 determines a rotational angle nominal value $\alpha$ on the basis of a clutch torque/rotational angle characteristic curve 111 which is stored in a non-volatile memory 113 of the control device 109, on the basis of the torque demand M. As a function of the difference between the rotational angle nominal value $\alpha$ and the rotational angle actual value $\alpha'$, the control device 109 generates a control signal for the electric motor 93 in order to adjust the friction clutch 49 (FIGS. 2 and 3) correspondingly. The control device 109 thus acts as a position regulator.

Said clutch torque/rotational angle characteristic curve 111 is based on an empirically determined average clutch torque/rotational angle dependency for a certain type of clutch unit 47. Said characteristic curve 1, which is stored in the memory 113 of the control device 109, thus forms a base characteristic curve. To compensate tolerance-related individual deviations of the actual clutch characteristic from the predefined characteristic curve 111 based on average values, however, every transfer box 15 which is produced is measured at the factory. Said measurement is carried out on a test stand on which firstly a predefined rotational speed difference can be set between the first output shaft 43 and the second output shaft 45 and secondly the actually transmitted clutch torque can be measured with relatively high accuracy, for example by means of torsion sensors. To set the rotational speed difference, the approach in practice is for the input shaft 41 or one of the output shafts 43, 45 to be held fixed while the other output shaft 45, 43 which is not held fixed is driven with a defined rotational speed by an electric motor. Alternatively, both input shafts 43, 45 or the input shaft 41 and the output shaft 45 could be driven in order to produce the desired rotational speed difference.

The characteristic curve 111 is then adapted to the actual transmission behavior of the respective transfer box 15 or of the clutch unit 47 using the dynamic calibration method and the static calibration method, as will be explained by way of example below with reference to FIG. 5.

Figure 5:
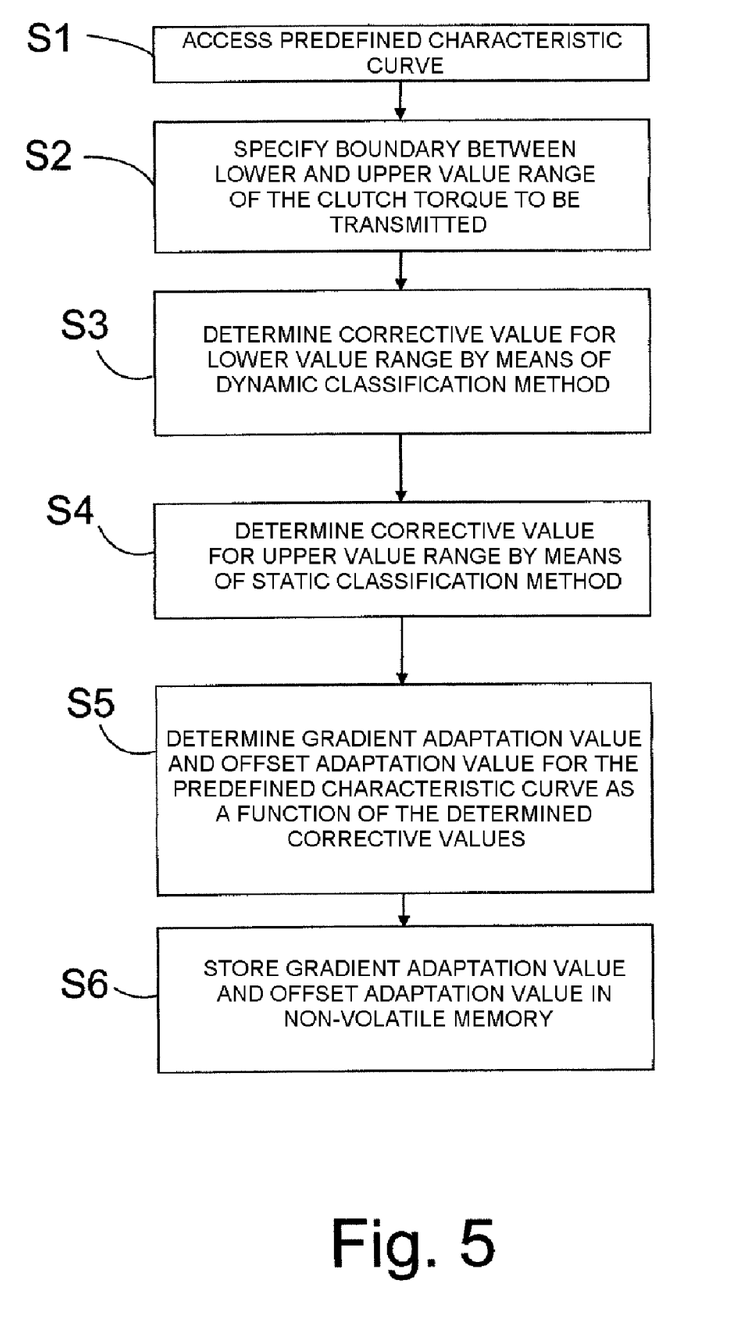
FIG. 5 shows a flow diagram of a classification method.

According to FIG. 5, in a step S1, the predefined characteristic curve 111 is accessed from the associated memory. In a step S2, a boundary is specified which divides the operating range of the clutch unit 47 into a lower value range and an upper value range of the clutch torque to be transmitted.

In a step S3, a corrective value for the lower value range is then determined by means of the dynamic calibration method. For this purpose, a predefined rotational speed difference is set between the first output shaft 43 and the second output shaft 45, with the actuator 51 not yet being actuated. Only after the desired rotational speed difference has been set is the actuator 51 actuated, and the electric motor 93 is set to a rotational angle which, according to the predefined characteristic curve 111, corresponds to a nominal value of a clutch torque lying within the lower value range. After the rotational angle is set, the transmitted clutch torque is measured in order to obtain an actual value of the clutch torque. The deviation between the nominal value and the actual value is subsequently determined, which deviation indicates the degree to which the predefined characteristic curve 111 must be adapted. Accordingly, a suitable corrective value for the lower value range is determined on the basis of the determined deviation. Depending on requirements, the method according to step S3 may be repeated for further nominal values of the clutch torque within the lower value range in order to obtain a plurality of respective corrective values.

In a step S4, a corrective value for the upper value range is determined by means of the static calibration method. For this purpose, the actuator 51 is actuated by virtue of the electric motor 93 being set to a rotational angle which, according to the predefined characteristic curve 111, corresponds to a nominal value of a clutch torque lying within the upper value range. During the adjustment, the first output shaft 43 and the second output shaft 45 do not rotate relative to one another, that is to say the rotational speed difference is zero. After the electric motor 93 is set to the corresponding rotational angle, that is to say after the actuator 51 has assumed the desired position, one of the output shafts 43, 45 is driven in order to set a predefined rotational speed difference between the first output shaft 43 and the second output shaft 45. After the rotational speed difference has reached the desired value, the transmitted clutch torque is measured in order to obtain an actual value of the clutch torque. Subsequently, the deviation between the nominal value and the actual value is again determined, and a corrective value for the upper value range is determined on the basis of the determined deviation. The method according to step S4 may also be repeated if required for further nominal values of the clutch torque within the upper value range in order to obtain a plurality of respective corrective values for the upper value range.

In a step S5, a gradient adaptation value and an offset adaptation value are determined as a function of the determined corrective values. The gradient adaptation value and the offset adaptation value are selected such that the characteristic curve 111, after a modification, is adapted to the best possible extent to the determined actual values of the clutch torque. By means of the predefined characteristic curve 111, the gradient adaptation value and the offset adaptation value, a characteristic curve which is adapted to the clutch unit 47 to be classified is defined. Said adapted characteristic curve is assigned to the clutch unit 47 by virtue of the gradient adaptation value and the offset adaptation value being stored in a non-volatile memory (step S6).

After the classification is carried out, the clutch unit 47 is delivered and connected to a control device 109. To control the clutch unit 47, firstly the predefined characteristic curve 111 stored in the memory 113 of the control device 109 is accessed. The control device 109 is capable of communicating with said non-volatile memory of the clutch device 47 and accessing the gradient adaptation value and the offset adaptation value. For example, said non-volatile memory may be electrically connected to the control device, or said non-volatile memory forms a part of the memory 113 of the control device 109. On the basis of the predefined characteristic curve 111 and the accessed adaptation values, the control device 109 takes into consideration an adapted characteristic curve, which is ultimately utilized for controlling the clutch device 47.

In the adaptation of a clutch characteristic curve by means of a gradient adaptation value and an offset adaptation value, it is fundamentally possible for a nominal value of the clutch torque to be multiplied with the gradient adaptation value in order to determine a modified nominal value of the clutch torque, with a preliminary nominal value of the rotational angle being determined on the basis of the characteristic curve 111 as a function of the modified nominal value of the clutch torque, and with the offset adaptation value being added to the preliminary nominal value of the rotational angle in order to determine a nominal value of the rotational angle. The stored predefined characteristic curve 111 itself remains unchanged in such a process, since only two parameters which are assigned to the characteristic curve 111 are updated. A complete re-establishment of the characteristic curve 111, with corresponding calculation and memory expenditure, is avoided in this way. The gradient adaptation value may also be smaller than one, such that the multiplication is equivalent to a division. Likewise, the offset adaptation value may be negative, such that the addition is equivalent to a subtraction.

While the invention can be used particularly advantageously in a transfer box with electromechanical actuation of the friction clutch, the invention is not restricted to the exemplary embodiment explained above. Other arrangements in the drivetrain of a motor vehicle are also possible, as explained in the introduction. Furthermore, the actuator 51 may be of some design other than that explained above in conjunction with the figures. For example, a different type of step-down gearing 97 or a different type of deflecting device 103 may be provided. Instead of the electromechanical actuation of the friction clutch 49 shown, it is for example also possible for an electromagnetic, hydraulic or electrohydraulic actuating means to be provided.

The invention claimed is:

1. Method for classifying a clutch unit for a drivetrain of a motor vehicle, wherein the clutch unit comprises at least one friction clutch for a controllable transmission of a torque from an input element to an output element and an actuator for actuating the friction clutch, wherein the clutch unit is controlled on the basis of a predefined characteristic curve which describes a predefined dependency of the friction clutch torque to be transmitted on an actuator control variable, the method comprises the following steps:
 (a) specifying at least one first and one second value range of the clutch torque to be transmitted;
 (b) determining at least one first corrective value, wherein firstly a predefined rotational speed difference is set between the input element and the output element, wherein subsequently, at the predefined rotational speed difference, the actuator is set to a value of the actuator control variable which, according to the predefined characteristic curve, corresponds to a nominal value of the clutch torque lying within the first value range, and wherein after the setting of the actuator, an actual value of the clutch torque is detected by measurement, wherein the first corrective value is determined as a function of a deviation between the nominal value and the actual value;
 (c) determining at least one second corrective value, wherein firstly the actuator is set to a value of the actuator control variable which, according to the predefined characteristic curve, corresponds to a nominal value of a clutch torque lying within the second value range, wherein after the setting of the actuator, a predefined rotational speed difference is set between the input element and the output element, and wherein an actual value of the clutch torque is detected by measurement after the setting of the rotational speed difference, wherein the second corrective value is determined as a function of a deviation between the nominal value and the actual value; and
 (d) adapting the predefined characteristic curve by means of the first and the second corrective value.

2. Method according to claim 1, wherein the first and second value ranges are specified as a function of a control strategy of the motor vehicle, and the control strategy is defined by a dependency of the clutch torque to be transmitted on the rotational speed difference between the input element and the output element.

3. Method according to claim 1, wherein the first value range corresponds to low clutch torques and the second value range corresponds to high clutch torques.

4. Method according to claim 1, wherein at least two corrective values are determined for one or both value ranges.

5. Method according to claim 1, wherein for an adaptation of the characteristic curve, a gradient and an offset of the characteristic curve is modified.

6. Method according to claim 1, wherein for an adaptation of the characteristic curve, a gradient adaptation value and an offset adaptation value are determined as a function of the first and second corrective values.

7. Method according to claim 6, wherein the predefined characteristic curve is stored in a control device which is connected to the clutch unit, wherein the determined gradient adaptation value and the determined offset adaptation value are stored in a non-volatile memory which is assigned to the control device.

8. Method according to claim 6, wherein the gradient adaptation value and the offset adaptation value is selected from a group of several predefined class values.

9. Method according to claim 5, wherein the predefined characteristic curve is divided into two characteristic curve sections which correspond to the first and the second value range, and wherein a respective gradient adaptation value and a respective offset adaptation value is determined for each of the characteristic curve sections.

10. Method according to claim 1, wherein the actuator has an electric motor, wherein the actuator control variable is a rotational angle of the electric motor or of a transmission element which is in engagement with the electric motor.

11. Method according to claim 1, wherein more than two value ranges of the clutch torque to be transmitted are specified.

* * * * *